United States Patent
Greene et al.

(10) Patent No.: US 8,447,993 B2
(45) Date of Patent: May 21, 2013

(54) INTEGRATED ENERGY SAVINGS AND BUSINESS OPERATIONS IN DATA CENTERS

(75) Inventors: Daniel H. Greene, Sunnyvale, CA (US); Bryan T. Preas, Palo Alto, CA (US); Maurice K. Chu, San Mateo, CA (US); Haitham Hindi, Menlo Park, CA (US); Nitin S. Parekh, Los Altos, CA (US); James E. Reich, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 633 days.

(21) Appl. No.: 12/018,737

(22) Filed: Jan. 23, 2008

(65) Prior Publication Data
US 2009/0187782 A1    Jul. 23, 2009

(51) Int. Cl.
G06F 1/00 (2006.01)
G06F 9/46 (2006.01)
G05D 3/12 (2006.01)
G05D 5/00 (2006.01)
G05D 9/00 (2006.01)
G05D 11/00 (2006.01)
G05D 17/00 (2006.01)

(52) U.S. Cl.
USPC ............ 713/300; 713/340; 718/104; 700/291

(58) Field of Classification Search
USPC .................... 713/300, 340; 718/104; 700/291
See application file for complete search history.

(56) References Cited

U.S. PATENT DOCUMENTS

| | | | |
|---|---|---|---|
| 5,924,486 A * | 7/1999 | Ehlers et al. | 165/238 |
| 5,999,888 A * | 12/1999 | Aubee | 702/45 |
| 6,366,581 B1 * | 4/2002 | Jepsen | 370/397 |
| 6,553,418 B1 * | 4/2003 | Collins et al. | 709/224 |
| 6,697,951 B1 * | 2/2004 | Sinha et al. | 713/300 |
| 6,775,267 B1 * | 8/2004 | Kung et al. | 370/352 |
| 6,859,882 B2 * | 2/2005 | Fung | 713/300 |

(Continued)

FOREIGN PATENT DOCUMENTS

| | | | |
|---|---|---|---|
| JP | 2001327074 A | * | 11/2001 |
| JP | 2002297350 A | * | 10/2002 |

(Continued)

OTHER PUBLICATIONS

Rong Ge; Xizhou Feng; Wu-chun Feng; Cameron, K.W.; , "CPU MISER: A Performance-Directed, Run-Time System for Power-Aware Clusters," Parallel Processing, 2007. ICPP 2007. International Conference on , pp. 18, Sep. 10-14, 2007.*

(Continued)

Primary Examiner — Faisal M Zaman
(74) Attorney, Agent, or Firm — Marger Johnson & McCollom PC (57) ABSTRACT

A power control system in a data center has a plurality of physical servers, each server having a local controller, at least one virtual server coupled to at least some of the physical servers, and a central controller to control task loading on the physical servers through the virtual servers. A method of controlling power consumption in a data center includes receiving inputs from local controllers residing on loads, the inputs including data about power consumption on the loads, receiving as an input at least one quality of service requirement, and allocating tasks to at least one server based upon the quality of service and the power consumption on the loads.

19 Claims, 5 Drawing Sheets

U.S. PATENT DOCUMENTS

| | | | |
|---|---|---|---|
| 6,985,937 B1* | 1/2006 | Keshav et al. | 709/223 |
| 7,003,279 B2* | 2/2006 | Nickum | 455/405 |
| 7,292,584 B1* | 11/2007 | Rautiainen et al. | 370/399 |
| 7,356,817 B1* | 4/2008 | Cota-Robles et al. | 718/1 |
| 7,401,240 B2* | 7/2008 | Heller et al. | 713/320 |
| 7,574,491 B2* | 8/2009 | Stein et al. | 709/220 |
| 7,626,994 B2* | 12/2009 | Bennett | 370/419 |
| 7,636,801 B1* | 12/2009 | Kekre et al. | 710/31 |
| 7,774,630 B2* | 8/2010 | Hatasaki et al. | 713/320 |
| 7,844,839 B2* | 11/2010 | Palmer et al. | 713/300 |
| 2001/0025209 A1* | 9/2001 | Fukui et al. | 700/291 |
| 2002/0035496 A1* | 3/2002 | Fukushima et al. | 705/7 |
| 2002/0083110 A1* | 6/2002 | Kozuch et al. | 709/1 |
| 2004/0254899 A1* | 12/2004 | Abe et al. | 705/412 |
| 2008/0005381 A1* | 1/2008 | Theocharous et al. | 710/18 |
| 2008/0104383 A1* | 5/2008 | Ardagna et al. | 713/1 |
| 2008/0148273 A1* | 6/2008 | Huang et al. | 718/104 |
| 2008/0167033 A1* | 7/2008 | Beckers | 455/432.3 |
| 2008/0320482 A1* | 12/2008 | Dawson et al. | 718/104 |
| 2009/0094097 A1* | 4/2009 | Gardenswartz | 705/10 |
| 2009/0106571 A1* | 4/2009 | Low et al. | 713/310 |
| 2009/0119673 A1* | 5/2009 | Bubba | 718/104 |
| 2009/0125667 A1* | 5/2009 | Hatasaki et al. | 711/6 |
| 2009/0132840 A1* | 5/2009 | Talwar et al. | 713/320 |
| 2009/0138887 A1* | 5/2009 | Uehara et al. | 718/104 |
| 2009/0150700 A1* | 6/2009 | Dell'Era | 713/324 |
| 2009/0187776 A1* | 7/2009 | Baba et al. | 713/320 |
| 2009/0327778 A1* | 12/2009 | Shiga et al. | 713/320 |
| 2010/0005473 A1* | 1/2010 | Blanding et al. | 718/104 |
| 2010/0010688 A1* | 1/2010 | Hunter | 700/300 |
| 2010/0010857 A1* | 1/2010 | Fadell | 705/8 |
| 2010/0031259 A1* | 2/2010 | Inoue | 718/1 |
| 2010/0100877 A1* | 4/2010 | Greene et al. | 718/1 |
| 2010/0241285 A1* | 9/2010 | Johnson et al. | 700/296 |
| 2010/0306776 A1* | 12/2010 | Greene | 718/101 |

FOREIGN PATENT DOCUMENTS

| | | | |
|---|---|---|---|
| JP | 2003309929 A | * | 10/2003 |
| JP | 2005274171 A | * | 10/2005 |
| JP | 2006153411 A | * | 6/2006 |
| JP | 2006158189 A | * | 6/2006 |
| JP | 2010081783 A | * | 4/2010 |

OTHER PUBLICATIONS

Jialing Zheng; Maode Ma; , "A utility-based joint power and rate adaptive algorithm in wireless ad hoc networks," Communications, IEEE Transactions on , vol. 57, No. 1, pp. 134-140, Jan. 2009.*

Kallitsis, M.G.; Michailidis, G.; Devetsikiotis, M.; , "A Framework for Optimizing Measurement-Based Power Distribution under Communication Network Constraints," Smart Grid Communications (SmartGridComm), 2010 First IEEE International Conference on , pp. 185-190, Oct. 4-6, 2010.*

Husheng Li; , "Scheduling of wireless metering for power market pricing in smart grid," Computing, Networking and Communications (ICNC), 2012 International Conference on , pp. 1156-1160, Jan. 30-Feb. 2, 2012.*

* cited by examiner

INTEGRATED ENERGY SAVINGS AND BUSINESS OPERATIONS IN DATA CENTERS

BACKGROUND

Many entities use data centers for multiple purposes. Service providers, such as phone companies, cable networks, power companies, retailers, etc., store and access customers' data in larger 'server farms,' or data centers. For purposes of discussion here, 'data center' means a facility used to house computer systems and associated components, such as telecommunications and storage systems. A data center generally includes not just the computer systems, but back up power supplies, redundant data communications connections, environmental controls such as air conditioning and fire suppression, and security systems and devices.

Data center operations generally revolve around customer service levels. For example, a particular customer may have an agreement to have a particular quality of service for that customer's computations or data communications. The quality of service (QoS) may have different requirements for different customers. For example, for one customer, the key measure of the quality of service may involve how fast an application responds when accessed remotely. For another customer, the quality of service may involve the speed or bandwidth of connections provided to that customer's subscriber.

Data center operations managers will generally optimize and manage the loading of tasks and processing based upon meeting the defined QoS requirements for the manager's customers. The manager may distribute processing task, etc., in response to changing customer requirements over time and conditions that relate to the processing load. The manager does not generally take into account the impact on energy consumption of the various customer requirements, nor does the manager take into account the 'true cost' of operations for a particular customer.

For example, a customer may have a particular quality of service requirement that generally results in several high-load processes running on several different servers during a limited time every day with high priority. During other times, the quality of service requirement may taper off to a minimal processing requirement. That customer's service level agreement (SLA) would generally have a provision guaranteeing the availability of the processes during the limited time and may charge the customer more.

Contrast this with a customer that has a quality of service requirement that is relatively low, but steady state. The servers are constantly running to meet the customer's requirement, but because the quality of service requirements is relatively low, the customer may be charged less than the previous customer.

This type of business model does not take into account that the second customer's load may actually cost the data center more, because of the constant power requirement. Alternatively, one could find that the second customer does actually result in a lower cost of operations due to the predictable nature of the load. However, without monitoring and taking into account the cost of the energy for the data systems and the necessary supporting systems, such as increased air conditioning needs when many servers are running at high speeds, one will not have data to make these types of decisions.

Further, data centers are becoming an increasing burden on the already strained power and energy resources. Current estimates show the power consumption of data centers to be between 1 and 2 percent of the national consumption. With increasingly more entities relying upon data centers, and the growing population, this number will rise. Some way to make decisions with regard to costs, as well as more efficiently manage the power consumption of data centers would assist in these issues.

DETAILED DESCRIPTION OF THE EMBODIMENTS

Figure 1:
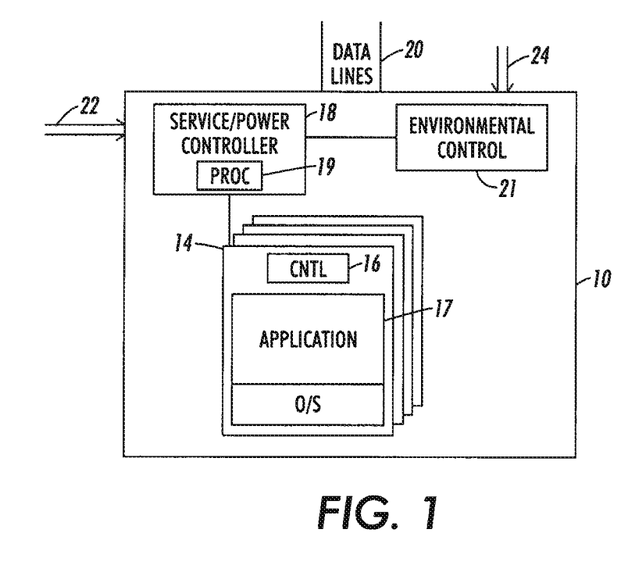
FIG. 1 shows an embodiment of a power control system for a data center.

FIG. 1 shows an architecture 10 for a data center. In this embodiment, the data center includes multiple physical servers. A physical server is an actual machine, such as a quad, dual or single core computing system that provides a particular service. Examples include communications servers, database servers, applications servers, etc.

A physical server differs greatly from a virtual server. A virtual server is one that appears to entities accessing it to be a single server, while it may actually be a partition or subset of a physical server. It may also appear as a single server, but actually be comprised of several physical servers. A virtual server is created through a virtualization process.

'Virtualization' may be defined as a technique for hiding the physical characteristics of computing resources from the way in which other systems, applications, or end users interact with those resources. This includes making a single physical resource such as a server, an operating system, an application, or storage device, appear to function as multiple logical resources. Virtualization may also include making multiple physical resources such as storage devices or servers appear as a single logical resource. It may also include making one physical resource to appear, with somewhat different characteristics, as one logical resource.

Using virtual servers enables the migration of processing tasks to other physical servers or resources transparently to the consumers of the services provided by the virtual server, where the consumer may be a user, a process, another computer, etc. A 'consumer' is any entity that uses a process or service within the power control system. This is contrasted with a 'customer' which is an identified entity to which the data center provides services according to a service level agreement. Performance levels are generally tracked by customers.

As such, the physical servers, such as 14 in FIG. 1 is depicted as being having several virtual servers such as 17 operating on it. A virtual server may be an application running on top of an operating system, for example. This is merely for demonstrative purposes and no limitation of location or logical hierarchy is intended, nor should one be implied. The virtual server 17 allows the service/power controller 18 to task the physical servers with processing tasks based in part on the power consumption/energy usage of the physical servers. This in turn allows optimization of the operation of the data center with regard to power consumption.

For ease of discussion, the service/power controller 18 may be referred to as the power controller. The controller 18 is a service/power controller, in that is controls the relationship between the quality of service demands and power consumption to balance the services demanded and paid for by customers while also managing the power consumption and distribution within the limits defined by the process.

Similarly, the controller 18 is shown as being a single controller, while it may actually be distributed across several computers, processing cores, etc. In addition to the central controller 18, one or more of the individual physical servers such as 14 may have local controllers such as 16. Further, while the only devices depicted in the diagram are servers, other types of devices may be included, such as power supplies, storage arrays or other storage, tape decks, etc.

The centralized controller 18 may be coupled to data lines 20. The functions of the data center generally revolves around data processing of some sort, and the controller may merely exist in the same power distribution structure as the data lines, or the power controller may monitor or affect the operation of the data lines.

Similarly, the power controller may merely exist in the same power structure as the power lines 22, or the power controller 18 may take a more active role with the power lines. The power lines 22 come in from 'the grid,' or the local power infrastructure that generally includes transmission lines, converters, transformers, power switches, etc.

The system may also couple to environmental input lines 24. These may be connections to the heating/ventilation/air conditioning (HVAC) system, lighting, other temperature sensors, etc. The power controller may use this in making determinations based upon external factors, as will be discussed in more detail later. Devices may exist in the server farm related to its maintenance and operation, shown as environmental control 15. The environmental control system 21 may control these devices. Examples include climate control systems such as HVAC; fire suppression systems, such as alarms, sprinklers, foam distributors, etc.; security systems and possibly even lighting. The power controller may regulate the operation of these systems in response to server level activity that may require cooling, hours of occupancy by operators, etc.

Figure 2:
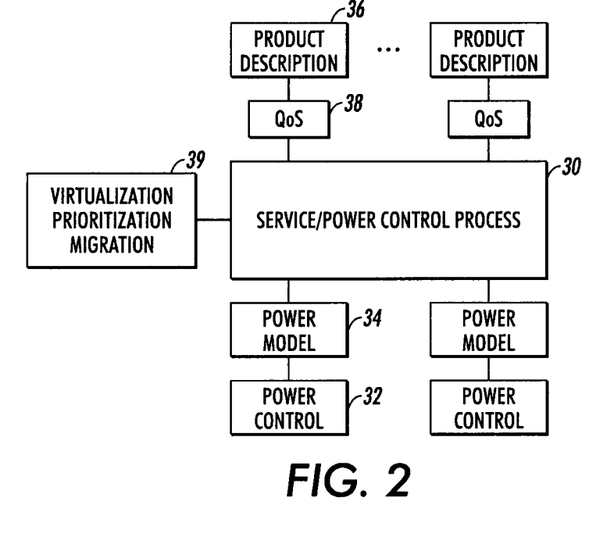
FIG. 2 shows a block diagram of an embodiment of a service/power controller process.

FIG. 2 shows a block diagram of an embodiment of a service/power control process 30 such as might be executed by the service/power controller device or subsystem in FIG. 1, again referred to as the power controller or power control process for ease of discussion. One of the concerns of the power control process is balancing the need to meet performance requirements with the desire or need to reduce power consumption.

The performance requirements are generally defined by customers. The data center manager may write a product description such as 36 for a customer that reads something like, "In this service, you will receive virtual processing equivalent to dedicated servers. You will receive the equivalent of 5 dedicated servers all of the time, but when their load is greater than 50%, the equivalent server count will expand automatically from 5 to as many as 20."

This is a product description that the customer understands. The manager would then write, or choose from a library, a companion quality of service (QoS) description 38. This QoS specification is more precise than the product description and is used by the power control process 30 of FIG. 2 to define the performance requirements of the data center with regard to that customer. Most data center will have multiple customers, either external or internal.

Figure 3:
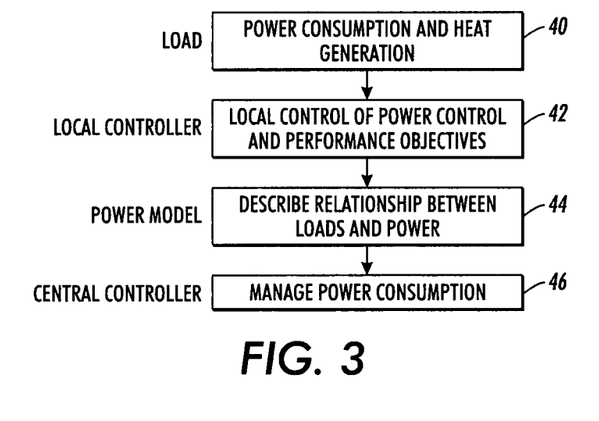
FIG. 3 shows a flowchart of an embodiment of a control path.

On the other side of the process is the power model and power control. This interaction may be better understood with reference to control flow diagrams, such as those shown in FIGS. 3 and 4. In FIG. 3, a control path for power begins at the load level 40. A load is any device that consumes power and generates heat, thereby loading the system. The load will generally have a local controller 42 to manage power to meet performance objectives. Local control provides a fast acting and reliable control with lower complexity than centralized control. Further, the local control may allow inclusion of legacy elements of the data center into the power control process.

A power model may exist between the local controller 32 and the central controller management of power at 30 of FIG. 2. The power model describes the relationship between loads and power consumption. The power model may aggregate local power controllers, such as describing an entire physical server.

The service/power controller such as 18 in FIG. 1 then receives this information from the power side of the power control process of FIG. 2, at 44 of FIG. 3, and may rearrange the processing tasks distributed to the loads to optimize power and business objectives at 46. The centralized control relates to local autonomous control via higher level power models. The centralized control performs the balancing between the performance requirements/business objectives and the power savings goals.

Figure 4:
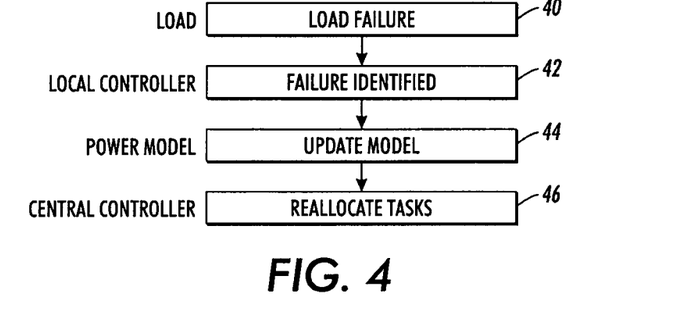
FIG. 4 shows a flowchart of an embodiment of a control path having a failure.

FIG. 4 demonstrates one scenario to assist in understanding of the control hierarchy. At 40, a load fails. For example, assume the load was a variable speed fan. The local controller identifies the load failure at 42, or it is identified by independent sensors. This power model updates at 44 to reflect the status of the load, such as by determining that the processor in the server associated with the failed fan should not run, or should be lightly loaded to avoid overheating. The power model then communicates this information to the central controller and the central controller reallocates processing to other machines, while still managing business objectives in light of the power saving targets.

Returning to FIG. 2, the discussion has focused on the inputs to the service/power controller process 30. The power controller process has several outputs as well. For example, the power controller may identify and plan for or schedule opportunities to virtualize servers. For example, the server with the failed fan may have processes migrated from it and a determination may be made in which that server is no longer necessary. Because that physical server was virtualized into virtual servers, the elimination of that server is transparent to the consumers of the virtual server's services.

The power control process may direct migration of processes/tasks to other servers depending upon power consumption. This may occur as a preparation for a shut down, or merely for power consumption reasons. For example, there may be a server that consumes more power when running at a relatively high level, so a process may be migrated off of that server to lower the over all processing level for the server, thereby reducing the power consumption. In this instance, there is no intention of shutting down the server, the migration was done to balance the power consumption.

The power control process may also optimize tasks based upon power consumption. If a relatively high power consuming application is currently running, a lower power consuming task may be run in parallel so as to not 'spike' the power consumption, as would occur if a new, high power consuming task were to be launched.

The power control process and the architecture of FIGS. 1 and 2 can now enable business objectives to be met in a data center while taking into account energy management. The discussion here will refer to power consumption to address the regulation of energy used in operating the data center. One difference between the current invention as set out here and current procedures for optimization of operation of data centers is that power consumption and quality of service here become primary considerations in management of the data center.

This ability to track and manage power consumption provides opportunities to allocate processing resources to stay within power consumption targets, figure out the true cost of providing a customer a particular service level, reward or provide incentives to customers with particular characteristics of power consumption, and to adjust task allocation to account for external factors. In addition, monitoring power consumption provides a framework in which resources may be identified for virtualization, allows dynamic adjustment of virtualization schedules to maximize performance and minimize costs, provides accurate costing, tracks real costs of services and supports future decision making on service offerings and resource expansion. Opportunities are also provided to maintain quality of service while minimizing power consumption.

Figure 5:
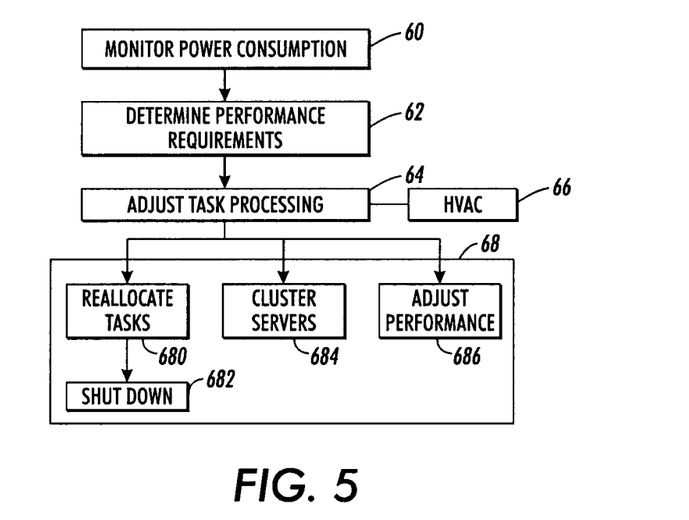
FIG. 5 shows a flowchart of an embodiment of a process for allocating resources based upon power consumption and performance.

FIG. 5 shows a flowchart of an embodiment to adjust processing loads based at least partially on power consumption. At 60, the power controller monitors power consumption data passed to it from the power models. At 62, the inputs from the QoS requirements become performance requirements for the tasks. Based upon the power consumption data and the need to meet performance objectives, the task processing is adjusted across the physical servers using the virtual servers discussed above.

The virtualization process 68 may involve many different options with regard to adjusting the operation of the physical servers 'behind' the virtual servers. The adjustments in processing resources will remain transparent to the user because of the virtualization that has already occurred.

At 680, one virtualization possibility would be to reallocate tasks to free up a physical server for shut down. Once any tasks operating on that server were reallocated or migrated to other servers, the physical server would be shut down, reducing power consumption. Again, to the consumers of the virtual server, this change would be transparent.

At 684, another virtualization opportunity may present itself in clustering servers geographically, by server type, by electrical characteristic, etc. Clustering servers may provide some advantages in efficiency that may ultimately reflect as lower power consumption. For example, clustering all of the servers used by one particular customer geographically together may provide for localized control of the HVAC system for that region. Alternatively, distributing servers geographically may increase reliability. Clustering may be done using affinity rules, as well.

In addition to adjusting the operational side, adjustments could be made to the requirements as well. The QoS specification may have allowances for lower levels of QoS or performance requirements at 686, not to exceed some portion of the service period, such as, "you may occasionally have as few as 5 servers assigned to you, but not more than 2 days a month." This would allow the system to virtualize additional servers as needed to reduce power consumption.

In addition to the changes made functionally to the servers, changes may be made to the environmental controls based upon the resource allocation at 66. The power controller may determine that less air conditioning is needed at particular periods of time because the servers are running at a lower level and therefore generating less heat, as an example.

In addition to allocating resources based upon power consumption, it is also possible to adjust service level agreements with customers based upon the predictability of their processing requirements and power consumption. Higher levels of predictability may result in lower costs, even though the overall level of processing required is high. Predictability also lends itself to better investment decisions with regard to adding resources.

For example, if a customer's business runs at a fairly medium level of processing requirements the majority of the time, and the customer's business is growing, a data center manager may be more likely to invest in more resources. However, if a customer's business runs at lower levels for long periods of time and has random spikes of very high level processing required, it is more difficult to determine if additional resources would be a wise investment. If predictability were to provide incentives in the service level agreements, it is possible that the customer may alter the behavior. Alternatively, raising the prices for the unpredictable customer would defray the costs of purchasing new resources that may remain largely idle until that customer's burst of activity hits.

Figure 6:
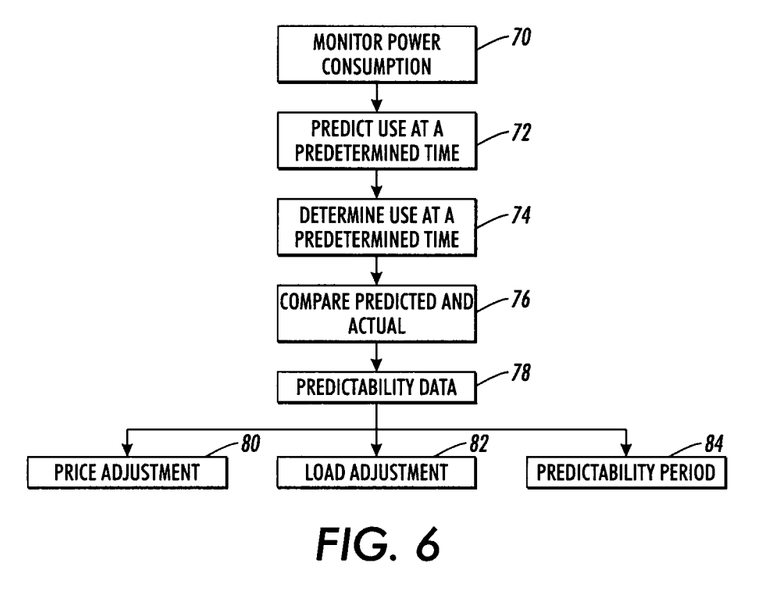
FIG. 6 shows a flowchart of an embodiment of a process for monitoring predictability of power consumption in a data center.

Of course, many predictive models may be used to determine how predictable a customer's power consumption is. Generally, the models will involve making a prediction and then comparing the predicted level with the actual level. An embodiment of this type of process is shown in FIG. 6.

At 70, the process monitors power consumption. It must be noted that this monitoring that occurs in many of the embodiments described herein may be an ongoing process. The embodiments of the methods do not necessarily 'start' with power monitoring. More accurately, the methods access the power monitoring capabilities described above.

The process would then predict power usage at a particular time in the future at 72. The time may be 10 seconds from now, 10 minutes from now, etc. The desired time period may depend upon several factors including having a short enough time period to allow for adaptation and adjustment of loads in a dynamic fashion. At 74, the actual power consumption at the predicted time would then be measured.

At 76 the predicted and actual power consumption may be compared to result in some sort of predictability data. This data may take the form of a predictability rating that feeds into pricing thresholds, etc. The predictability data determined at 78 would then also affect such things as price adjustments at 80, load adjustments in a proactive fashion when a change in power consumption is predicted to be imminent at 82, and adjustments in a period of time used for judging predictability at 84.

As mentioned above, the model used to make the prediction may employ several different methods. For example, the power consumption predicted to be used in 10 minutes may be based upon the current power consumption. Alternatively, the power consumption may be based upon a power consumption history. For example, a particular customer may perform updates to its system at midnight every night. If it is 11:50 pm, the predicted power consumption at 12:00 would be vastly different than the current power level and the prediction would have little to do with the current power level.

Instead, the power consumption history would predict a much higher level of power consumption.

In addition to being able to predict power consumption and price service level agreements based upon the predictability of power consumption for a particular customer, the data center manager may be able to price service level agreements more appropriately based on power consumption. For example, a cost of operations used in pricing service level agreements generally involves determining the cost of the resources necessary to meet a particular service level agreement. These costs may include amortization of the purchase of the server, use of the devices themselves and an overhead cost of the facility. The ability to add in the cost of power consumption would make these costs more accurate and provide an ability to determine a true cost of operations.

Figure 7:
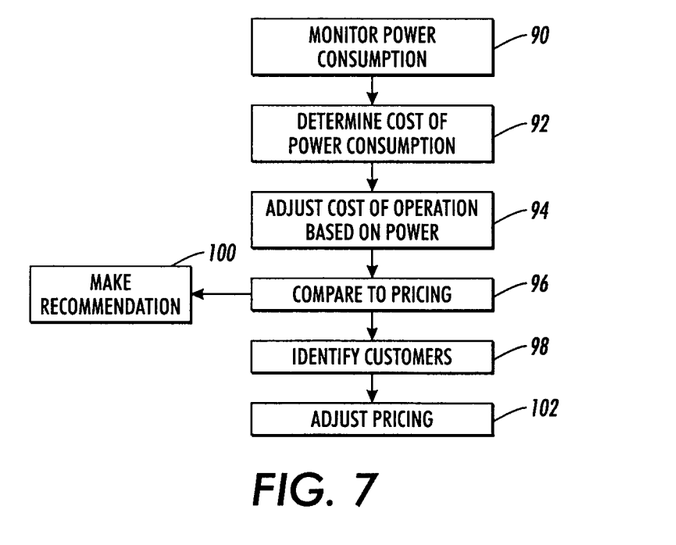
FIG. 7 shows a flowchart of an embodiment of a process for monitoring power consumption and the associated cost in a data center.

FIG. 7 shows an embodiment of a method to track power consumption and determine a true cost of operation. The power consumption is monitored at 90, as discussed above. At 92, the cost of the power consumption is determined, generally using the price provided from the power supplier of the grid from which the data center receives power. This pricing may vary depending upon grid conditions, time of the day, day of the month, etc. The power controller would compute the cost of power consumption for the customer during operations in support of the customer.

The system would then adjust the cost of operations based on this cost at 94. The system may also have access to an accounting system that can perform this adjustment, rather than performing it at the power control system level. This information would then be provided to the data center manager at 98, possibly as an automated report showing a comparison of the price charged that customer versus the adjusted cost of operations determined at 96 or a recommendation to change the customer's pricing, etc. at 100. The information may be provided at 98 as an identification of the profitable clients, most efficiently priced clients, or the properly provisioned customer, which would be those whose pricing is appropriate in light of the true cost of that customer's operations.

In one embodiment, this process may be entirely automated. The customer would have a service level agreement that allowed for some variability in the price within some agreed upon range. The system could dynamically adjust the pricing depending upon the true costs of operation at 102.

This automatic adjustment of the pricing further illustrates that the system assists at different levels of managing the data center operations. This information gathered from the power monitoring can be used strategically, operationally or for planning. Strategic use would generally include using the information gathered to make decisions on future service offerings, and investments in resource expansion. The example above demonstrates an operational use, allowing dynamic adjustment of not just pricing, but can also include dynamic adjustment of virtualization. Planning use generally includes identification, demonstration and implementations of virtualization opportunities.

Figure 8:
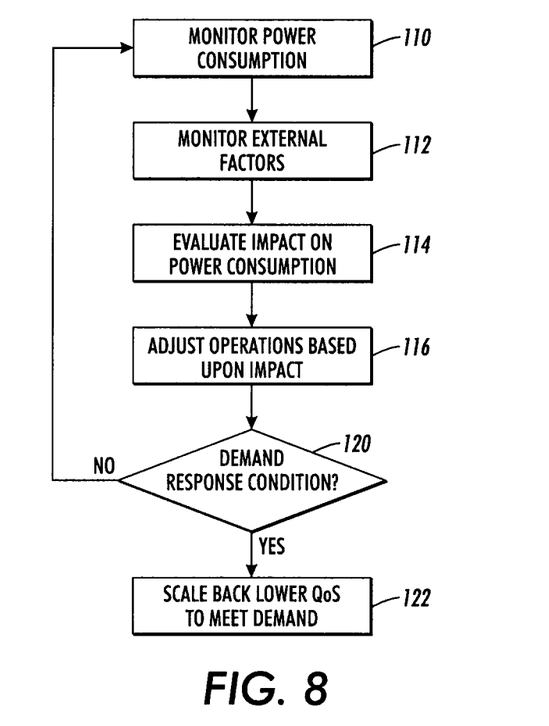
FIG. 8 shows a flowchart of an embodiment of a process for adjusting operations of a data center based upon the impact of external factors on power consumption.

In addition to adjustment of the processing loads and pricing, power control also allows for adjustment of operations based upon external factors. External factors may include the state of the power grid external to the data center, environmental factors such as the outside temperature, as that affects the cooling requirements of the data center, etc. FIG. 8 shows an example of this type of adjustment.

In FIG. 8, the power consumption is monitored at 110. The system also monitors external factors at 112. The impact of these external factors is evaluated at 114. This may include determining HVAC control adjustments based upon an outside temperature, either for today, or for example, for tomorrow's expected temperature. The state of the grid may also have an impact on operations, as the pricing may fluctuate depending upon the demands on the grid.

One special condition that may exist on the grid, for example, is what is referred to as a demand response condition. A demand response condition occurs when the demand on the grid hits a predetermined load and power consumers that can reduce their consumption are given incentives to do so. If a demand response condition exists at 120, the power controller can scale back those processing tasks with lower quality of service requirements than other processing tasks. This would allow the data center to receive preferential pricing and reduce costs.

Returning to 114, the evaluation of the impact can then result in adjustment of operations based upon the predicted or actual impact at 116. The adjustment may include distribution of loads, shutting down a server, or not shutting down a server that would otherwise have been shut down, manipulation of the HVAC system controls, etc.

The ability to monitor power consumption of all of the devices in a data center can then allow better management of the data center. This monitoring, combined with virtualization of the resources, allows the power controller to adjust operations, pricing and virtualization as needed to minimize power consumption of the data center.

The power controller may be implemented as a stand alone computing device, having at least one processor as shown in FIG. 1. The methods described here may be implemented as computer-controlled methods. Additionally, they may be implemented as instructions stored on a computer-readable medium, that when executed cause a computer to perform the methods described here.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A power control system in a data center, comprising:
    at least one physical server;
    at least one virtual server coupled to the at least one physical server;
    at least two loads, each load having a local power controller in communication with a power model; and
    a server/power controller to control task loading on the at least one physical server through adjustment of tasks on the at least one virtual server, the server power controller receiving inputs from the power model about status of the loads and power consumption including a predictability rating of power consumption of a particular customer where the predictability rating affects cost of power to the particular customer, and quality of service requirements for that customer selected based upon a business input, and generating signals to arrange processing tasks to meet power saving targets.

2. The power control system of claim 1, further comprising an environmental control system in communication with the server/power controller.

3. The power control system of claim 1, further comprising data lines coupled to the data center.

4. The power control system of claim 3, the server/power controller coupled to the data lines.

5. The power control system of claim 1, further comprising at least one external power line coupled to the data center.

6. The power control system of claim 5, the server/power controller coupled to the power line.

7. The power control system of claim 1, the server/power controller to transmit signals to control assignments of the virtual servers to the physical servers.

8. The power control system of claim 1, the system further comprising a user interface configured to present an operator one or more quality of service options at different costs, wherein the operator selection of one of the quality of service options becomes the business input.

9. A computer-controlled method of controlling power consumption in a data center, comprising:
- receiving inputs from controllers monitoring loads, the inputs including data about power consumption on the loads received at a power model, the power model describing a relationship between the loads and power consumption, wherein power consumption includes a predictability rating of power consumption of a particular user where the predictability rating affects cost of power to the particular customer, and a current status of the load and aggregating the inputs from local power controllers;
- receiving as an input at least one quality of service requirement selected based upon a business input; and
- generating signals to arrange processing tasks to meet power saving targets.

10. The computer-controlled method of claim 9, further comprising developing a power usage model from the data about power consumption and the quality of service requirement.

11. The computer-controlled method of claim 10, further comprising updating the power usage model over time.

12. The computer-controlled method of claim 9, further comprising providing a recommendation as to assignment of virtual servers to the at least one physical server.

13. The computer-controlled method of claim 9, wherein allocating tasks comprises migrating all tasks from a server having a low level of utilization and shutting the server down.

14. The computer-controlled method of claim 9, wherein allocating tasks comprises clustering at least one virtual server on a physical server.

15. The computer-controlled method of claim 14, wherein clustering is based upon at least one of geographic, electrical characteristics, network diversity, and heating/ventilation/air conditioning system connections.

16. The computer-controlled method of claim 9, wherein allocating tasks comprises adjusting performance levels of at least one server.

17. The computer-controlled method of claim 9, wherein allocating tasks comprises adjusting the quality of service requirement based upon power consumption.

18. The computer-controlled method of claim 8, wherein allocating tasks comprises adjusting power consumption based upon the quality of service requirement.

19. The computer-controlled method of claim 9, wherein the business input is received from an operator making a selection from one or more quality of service options at different costs.

\* \* \* \* \*

UNITED STATES PATENT AND TRADEMARK OFFICE
CERTIFICATE OF CORRECTION

| | | |
|---|---|---|
| PATENT NO. | : 8,447,993 B2 | Page 1 of 1 |
| APPLICATION NO. | : 12/018737 | |
| DATED | : May 21, 2013 | |
| INVENTOR(S) | : Greene et al. | |

It is certified that error appears in the above-identified patent and that said Letters Patent is hereby corrected as shown below:

In the Claims

Column 10, line 23, Claim 18, delete "claim 8" should read --claim 9--.

Signed and Sealed this
Eighteenth Day of March, 2014

Michelle K. Lee
*Deputy Director of the United States Patent and Trademark Office*